May 7, 1968     W. W. RAIRIGH     3,381,767
PORTABLE ELECTRONIC WHEEL LOAD SCALE
Filed Feb. 28, 1967
FIG.1
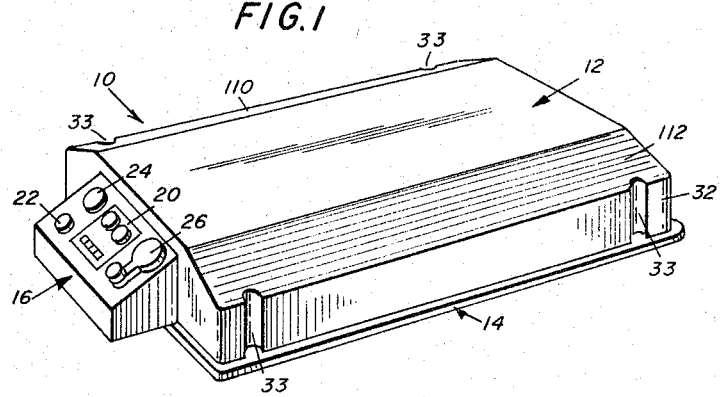
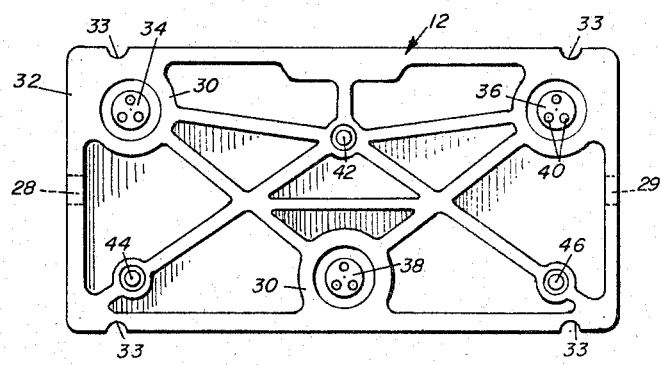
FIG.2
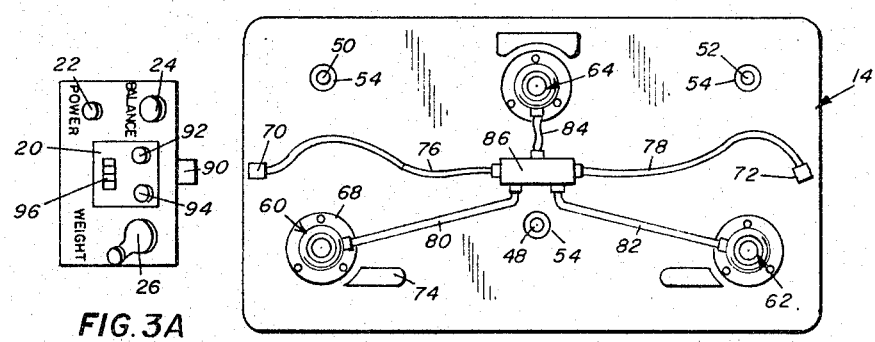
FIG.3
FIG.3A
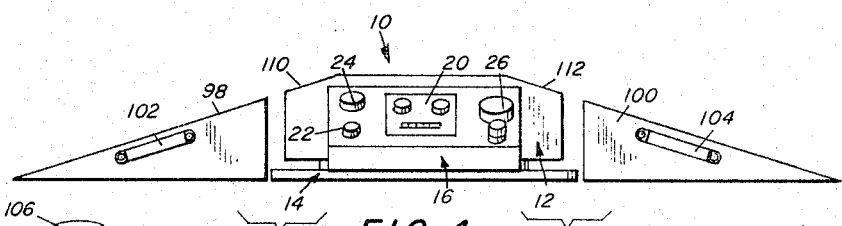
FIG.4
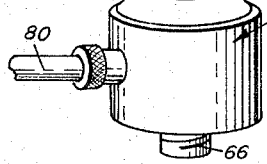
FIG.5
INVENTOR
Wilson Wayne Rairigh
BY *Blalock and Jones*
ATTORNEYS

United States Patent Office 3,381,767
Patented May 7, 1968

3,381,767
PORTABLE ELECTRONIC WHEEL LOAD SCALE
Wilson Wayne Rairigh, Baltimore, Md., assignor to Loadometer Corporation, Baltimore, Md., a corporation of Maryland
Filed Feb. 28, 1967, Ser. No. 619,277
9 Claims. (Cl. 177—126)

ABSTRACT OF THE DISCLOSURE

A portable electronic scale having a base, a weighing platform and three electronic load cells supporting the platform on the base. Scales may provide local weight indication, or may be connected singly or in combination to a remote indicator.

Field of the invention

The present invention relates, in general, to a weighing apparatus and, more particularly, to a portable electronic wheel load scale for weighing large vehicles or other heavy loads.

Description of the prior art

There has been a need for a portable wheel load scale of an electronic type that would overcome certain of the disadvantages inherent in the mechanical wheel load scales now in use. Such mechanical scales utilize a system of levers and knife edges to provide an indication of the applied weight, but these devices are complex, heavy, support only one tire of a dual tired wheel, are difficult to move from one place to another, and have a projecting column subject to damage. They also require several men to efficiently weigh a truck. The presently used mechanical scales utilize an upright column in which is located the indicating mechanism and this construction not only makes it difficult to transport these scales, but the upright columns have been known to break off while the scales are being used to weigh large trucks on the highways. An additional disadvantage of the prior portable mechanical scales was their inability to provide weight indications at a location remote from the scale itself.

Portable electronic scales have been designed in the past, but such scales have utilized a combination of a load cell or other equivalent measuring device with a mechanical leverage system involving knife edge supports. Such prior devices have proved unsatisfactory because they do not avoid the disadvantages of the mechanical scales, and thus remain inaccurate, expensive to produce, and lacking in compactness of construction. As a result, no portable electronic wheel load scales have been successfully produced.

Accordingly, it is a primary object of the present invention to provide a portable electronic wheel load scale having a novel structure and arrangement of parts which enables it to be accurate, efficient in use and economical to manufacture.

Another object of the invention is the provision of a portable electronic scale which utilizes load cells or equivalent transducers in a self-contained weighing unit and thus eliminates the requirement of levers, knife edges and similar mechanical arrangements.

It is another object of the present invention to provide a portable electronic scale having a top weighing surface that is free of obstruction, having an indicator portion which does not extend above the top weighing surface.

A further object of the invention is the provision of a portable electronic wheel load scale having indicator means which is removable from the scale and which may be located remotely from the scale and connected thereto by means of a suitable cable for measuring the weight of the load from the remote location.

It is yet another object of the present invention to provide a portable electronic wheel load scale having a weighing surface constructed of a ribbed aluminum waffle-like structure which provides increased strength while reducing the weight of the portable scale. Such a construction has not been used in the prior art since the mechanical linkages of the levers and knife edges have made the use of ribs inconvenient and uneconomical.

It is another object of the present invention to provide a portable electronic wheel load scale so constructed so as to have a total height from the bottom of the base to the top of the weighing platform that is less than that which was possible with the scales heretofore used or made.

A still further object of the invention is the provision of a portable electronic wheel load scale wherein the load cell, platform and base, power source and indicator unit are constructed in a single, unitary, self-contained package, the construction further permitting removal of the indicator unit for use at remote locations or for connection of a plurality of self-contained units in series, with their combined loads being registered on one indicator.

Summary of the invention

Briefly, the portable electronic scale of the present invention consists of a weighing platform, a base and an indicator unit. The platform provides a flat surface on which the load to be measured can rest and this platform, in turn, rests on three load cells which are mounted on the base. The load cells are distributed on the base so as to accept the entire weight of the applied load. The load cells each respond to the applied weight to produce output signals proportional thereto. The signals are fed to the indicator unit where they are added, the resultant signal producing an indication of the weight of the applied load. The indicator unit provides a digital read-out, the setting of which may be obtained by means of a mechanical rebalancing of a bridge circuit with, for example, a pair of balance indicating lights showing the presence of and the direction of an unbalanced condition. Light weight, portable ramps may be provided to permit the wheel of a vehicle to ride up onto the platform of the scale unit.

Brief description of the drawing

The novel features which are characteristic of the present invention are set forth with particularity in the appended claims, but the invention will be understood more clearly and fully from the following detailed description of a preferred embodiment thereof, as set forth in connection with the accompanying drawings in which:

FIG. 1 is a perspective view of an assembled load scale in accordance with the present invention;

FIG. 2 is a plan view of the top platform for the scale viewed from below and showing its ribbed construction;

FIG. 3 is a top view of the scale base showing the arrangement of the load cells and FIG. 3A similarly shows the indicator unit;

FIG. 4 illustrates the use of the scale with its associated ramps in place; and

FIG. 5 is a perspective view of a load cell suitable for use in the present scale.

Description of the preferred embodiment

Referring now to the perspective illustration of FIG. 1, the numeral 10 indicates a portable electronic scale made in accordance with the present invention. As shown, the scale includes a top weighing platform 12, a base 14 and an indicator unit 16. Platform 12 provides a surface on which may be placed the item to be weighed and also acts as a cover or housing for the load cells and other equipment mounted on the base 14. Platform 12 is movable with respect to base 14 in order to exert a compressive force on the load cells but is so mounted as to be relatively immovable in a lateral direction with respect to the base. A suitable handle may be provided on the housing to permit easy portability of the scale. The carrying handle may be recessed in the housing or may be mounted in any other suitable manner. When assembled, the scale in this preferred embodiment is only three and ¼ inches high and weighs less than sixty pounds. Platform 12 is sufficiently wide to accommodate the dual tire wheels of large trucks so that it may be used along highways or in loading yards to measure the weight of a truck. Indicator unit 16 is located at either end of the scale, it being illustrated in the embodiment at the left-hand end, and includes a read-out panel 20, on-off switch 22, a zero-adjustment dial 24 and a balancing crank 26. Weight measurements are obtained by rotating the balancing crank 26 until the read-out panel indicates a condition of balance in the system. The weight of the applied load may then be read directly from the digital indicator included in the panel 20.

The ribbed structure of weighing platform 12 is illustrated in FIG. 2, which is a bottom view of the platform. In a preferred embodiment of the invention, the scale is designed to have a capacity of 20,000 pounds. Ribs 30 extend downwardly from the top surface of platform 12 and are arranged so as not to interfere with the operation of the load cells. The downwardly extending edge portion 32 of platform 12 is a part of platform 12 and surrounds the inner ribbed portion and the load cells with their connecting cables. The edge portion of the platform may be indented, as at 33, to provide hand hold notches which facilitate handling of the scale when it is being positioned for a weighing operation. The platform, ribs and edge portion are preferably cast from aluminum, although other suitable material may be used. Located in spaces between the ribs 30 are three bearing plates 34, 36 and 38. These plates are spaced so as to contact the tops of the load cells which are mounted on base 14 when the scale is assembled. For purposes of illustration, three load cells and thus three bearing plates are shown and described; however, it will be apparent that additional load cells may be used in the scale if desired. The bearing plates are fastened to the undersurface of platform 12 as by means of screws 40 which are countersunk in the bearing plate to provide a flush surface. Plates 34, 36 and 38 are preferably of hardened steel and, if desired, may be provided with centrally-located indentations to insure centering of the load cells on the plates. Threaded holes 42, 44 and 46, located in ribs 30, are adapted to receive bolts which pass through base 14 to hold the scale in assembled relationship. Three such threaded holes are illustrated, but it will be apparent that additional fasteners may be utilized. Similarly, it will be apparent that alternative means may be used to fasten the platform to the base so that these two portions are relatively movable in compression but will remain assembled while the scale is being moved from one location to another. Openings 28 and 29 are provided in the edge portion 32 at each end of the platform to accommodate the output cables from the load cells, to be described.

Aligned with the threaded holes 42, 44 and 46 when the scale is assembled are three unthreaded holes 48, 50 and 52 in the base 14, illustrated in FIG. 3. Each of these latter holes is provided with a recessed shoulder portion 54 into which fit the heads of the bolts used to assemble the scale. Holes 48, 50 and 52 are unthreaded so that the bolts pass freely therethrough, with the shoulder portion 54 limiting the motion of the platform 12 away from base 14 while permitting these two portions to move toward each other under compressive loads.

As illustrated in FIG. 3, load cells 60, 62 and 64 are arranged on base 14 in positions corresponding to the location of bearing plates 34, 36 and 38 respectively. Each of the load cells may be provided with a threaded mounting stud such as that illustrated at 66 (FIG. 5), permitting the load cell to be mounted on base 14 either by means of threaded holes in the base plate itself or in a mounting plate such as that illustrated at 68, which is, in turn, fastened to base 14 by any suitable means. Alternatively, the threaded studs may be eliminated, and the cell mounted in bored recesses in the base 14. When mounting plates are used, the base may be provided with locating blocks such as that illustrated at 74 to insure that the mounting plates are properly located and thus that the load cells will be centered on the bearing plates of platform 12.

Electrical cables 80, 82 and 84 carry excitation current to the load cells and carry the output signals representative of the weight being measured from the cells to junction block 86 mounted by any suitable means on base 14. Block 86 is provided with cables 76 and 78 having connector sockets 70 and 72, respectively, which are adapted to receive a connector plug 90 carried by the indicator unit 16. These connector sockets may be mounted in bored holes 28 and 29 in each end of the platform 12. If the connectors 70, 72 and 90 do not adequately support indicator box 16, additional support means may be provided.

Excitation voltages are applied to the three load cells by way of connectors 90 and 70 or 72 and cables 76 or 78, 80, 82 and 84. This excitation voltage is applied to the primary windings of differential transformers in the several load cells. These differential transformers have movable cores which respond to the weight applied to platform 12 to move with respect to the secondary windings of the respective transformers, varying the inductance between the respective primary and secondary windings to produce output voltages proportional to the motion of the cores and thus to the weight applied. The output signals from the secondary windings of the differential transformers of each load cell are fed through lines 80, 82 and 84, respectively, to the junction block 86 where they are added and fed by way of cables 76 or 78 and connectors 70 or 72 to the indicator unit.

The indicator unit may include a self-contained power supply to generate the required excitation voltage or this voltage may be supplied from an external source. The unit 16 further includes a rebalanceable bridge circuit to which is applied the output signal from the several load cells. The occurrence of this signal causes an unbalanced condition in the bridge circuit. This bridge is provided with a rebalancing potentiometer which may be adjusted by means of balancing crank 26 to return the bridge to a balanced condition. The state of the bridge is indicated by means of signal lights 92 and 94 on the read-out panel 20, one light indicating an unbalanced condition in one direction and the other indicating an unbalanced condition in the opposite direction, the light which is burning giving an indication of the direction in whch crank 26 must be turned in order to rebalance the system. A digital read-out dial 96 is provided on panel 20 and is connected to crank 26 to record its number of revolutions and thus to indicate the actual position of the movable arm of the potentiometer. When both lights 92 and 94 are on, and of equal brilliance, the bridge is in a balanced condition and the position of the potentiometer arm, and thus the weight being applied to platform 12, may be read directly from the dial 96. If a remote indication is required, the indicator unit 16 may be connected to the junction block 86 by means of an electrical cable connected at one end to connector sockets 70 or 72 and at the other end to connector plug 90. This cable may be of any practical length to provide a read-out at any desired location. If desired, a single indicator unit may be used to provide a read-out for a plurality of scale units.

Eight, ten or more scale units may be connected to each other by means of interscale connector cables (not shown) and then to indicator unit 16 by means of connector plugs 70, 72 and 90, where a rebalancing of the bridge circuit will give the total weight being applied to the several scale units.

Referring now to FIG. 4 there is illustrated a scale unit 10 flanked by a pair of portable ramps 98 and 100, each of which includes a carrying handle such as those illustrated at 102 and 104. These ramps permit trucks and other heavy vehicles to be driven up on the scale unit without damaging the scale. Ramps 98 and 100 may be of any suitable material such as wood blocks or ribbed aluminum castings. The upper surface of the platform preferably is tapered at 110 and 112 to the same angle as the ramps 98 and 100 so as to shorten the ramp length required. As may be seen from FIG. 4, the indicator unit 16 is mounted below the upper surface of platform 12 so it will not be damaged if a truck should be driven onto the scale with a tire extending over the end of the platform. Inasmuch as the scale utilizes no lever arms or knife edges, a low profile can be maintained, not only making it easier for a truck to be driven onto the scale, but providing a more accurate reading when only one scale is being used and weight measurements are taken from each wheel in turn of the vehicle to be weighed. Since the wheel being weighed is not lifted very far off the ground, the vehicle is not tilted appreciably, and thus the scale more accurately indicates the level weight on that wheel. However, since these scale units may easily be connected in series, it is a relatively simple matter to weigh the wheel load of all the wheels of a vehicle at the same time to provide a single read-out of the total weight.

FIG. 5 illustrates a load cell suitable for use in the present portable electronic wheel load scale. As has been previously described, the load cell 60 may include a mounting stud 66 for fastening the cell to base 14. The upper surface 106 of the cell contacts the corresponding bearing plate mounted on platform 12 and receives the compressive force applied by the load to be measured. Electrical cable 80 carries the excitation voltage to the load cell and carries the differential transformer output to the indicator means. A load cell suitable for use in the present scale unit is model PB-35, produced by the Dole Valve Co., Morton Grove, Illinois. Comparable load cells utilizing transducers other than differential transformers may, of course, be used in place of the differential transformer unit, as will be apparent to those skilled in the art.

Thus, there has been described a preferred embodiment of a portable electronic wheel load scale which is compact, relatively lightweight, and which eliminates the complex and troublesome mechanical linkages used in previous scale units. The present unit provides accurate measurement of weight and utilizes an indicator which may be located at the scale unit or remotely therefrom without any adverse effects on reliability or accuracy. Since various modifications of the preferred embodiment will be apparent to those skilled in the art, it is desired that the foregoing description be taken as illustrative and limited only by the following claims.

I claim:

1. A lightweight, self-contained, low profile portable electronic wheel load scale comprising: a base; a weighing platform; at least three load cell means attached to said base and spaced to support said weighing platform; a junction block mounted on said base; electric cable means connecting each of said load cell means to said junction block, whereby said load cell means may be energized and output signals from said load cell means representative of the load applied to said weighing platform may be fed to said junction block; at least three bearing plate means mounted on the under surface of said weighing platform for receiving the upper portion of corresponding load cell means whereby the load applied to the upper surface of said weighing platform is distributed to said load cell means, the under surface of said platform including a plurality of ribs for strengthening said platform; fastening means for attaching said platform to said base, said fastening means limiting relative motion between said platform and said base to a direction substantially perpendicular to said base, whereby compressive forces may be applied directly to said load cell means; indicator means; means for attaching said indicator means to said base; and connector means for feeding said output signals to said indicator means, whereby said indicator means provides a measure of the weight applied to said platform.

2. The portable scale of claim 1, wherein said means for attaching said indicator means to said base includes socket means on said base so located that when said indicator means is attached to said base, the upper surface of said indicator means is spaced below the upper surface of said platform, whereby said weighing platform is free of obstructions.

3. The portable scale of claim 1, wherein said scale includes only three load cell means attached to said base, said load cell means being so spaced that the first load cell is on one side of said base and the remaining load cells are on the opposite side of said base, whereby the load applied to said weighing platform is distributed among said load cells.

4. The portable scale of claim 1, further including mounting plate means for fastening each said load cell to said base, and locating blocks mounted on said base for positioning said mounting plate means.

5. The portable scale of claim 1, wherein said indicator means includes an indicator unit having a read-out means, balancing means for comparing the setting of said read-out means with said output signals, and means for denoting an unbalanced condition, whereby said read-out means provides an indication of the weight of said applied load when said balancing means is adjusted to a balanced condition.

6. The portable scale of claim 5, wherein said balancing means includes a manually rotatable measuring crank for adjusting the setting of said read-out means, said means for denoting an unbalanced condition comprising at least one signal light.

7. The portable scale of claim 6, wherein said means for denoting an unbalanced condition comprises a pair of signal lights, one of said lights indicating an unbalanced condition in one direction and the other light indicating an unbalanced condition in the opposite direction.

8. The portable scale of claim 7, further including portable ramp means for facilitating the placement of a load to be weighed on said weighing platform.

9. The portable scale of claim 8, wherein the upper surface of said weighing platform is tapered at opposite sides to match the angle and height of said portable ramp means.

References Cited

UNITED STATES PATENTS

| | | |
|---|---|---|
| 1,936,178 | 11/1933 | Sykes. |
| 2,393,708 | 1/1946 | Reichel. |
| 2,962,276 | 11/1960 | Thurston _____ 177—126 |

FOREIGN PATENTS 654,001  12/1962  Canada.

RICHARD B. WILKINSON, *Primary Examiner.*

G. H. MILLER, JR., *Assistant Examiner.*